United States Patent [19]

Staendeke

[11] Patent Number: 5,750,601
[45] Date of Patent: May 12, 1998

[54] FLAME RETARDANT POLYMERIC COMPOSITIONS

[75] Inventor: Horst Staendeke, Lohmar, Germany

[73] Assignee: Hoechst Aktiengesellschaft, Frankfurt, Germany

[21] Appl. No.: 760,051

[22] Filed: Dec. 4, 1996

[30] Foreign Application Priority Data

Dec. 15, 1995 [DE] Germany ............... 195 46 834.1

[51] Int. Cl.$^6$ ................................................. C08K 5/5357
[52] U.S. Cl. ............................. 524/117; 521/85; 521/107
[58] Field of Search .................... 521/85, 107, 168; 524/117; 558/82

[56] References Cited

U.S. PATENT DOCUMENTS

| | | | |
|---|---|---|---|
| 2,883,411 | 4/1959 | Lanham | 524/117 |
| 3,006,946 | 10/1961 | Lanham | 524/117 |
| 3,872,053 | 3/1975 | Fath et al. | 521/107 |
| 4,035,448 | 7/1977 | Mayerhoefer et al. | 524/117 |
| 4,049,617 | 9/1977 | Albright | 521/168 |
| 4,198,493 | 4/1980 | Marciandi | |
| 4,461,862 | 7/1984 | Eigenmann | |
| 5,312,853 | 5/1994 | Staendeke et al. | |
| 5,326,805 | 7/1994 | Sicken et al. | |

FOREIGN PATENT DOCUMENTS

| | | |
|---|---|---|
| 0258685 | 3/1988 | European Pat. Off. |
| 0584567 | 3/1994 | European Pat. Off. |
| 2 342 928 | 3/1974 | Germany |
| 80 01697 | 8/1980 | WIPO |

OTHER PUBLICATIONS

Noda, E., *Chem. Abs.* 93:133266 (1980).
Troitzsch, J., *International Plastics Flammability Handbook*, Munich, Carl–Hanser–Verlag, 1990, pp. 53–60.
John W. Lyons: The Chemistry and Uses of Fire Retardants–(1970) 20–24 Wiley Interscience.
Patent Abstract of Japan, JP 54080355, Jun. 27, 1979, Mitsubishi.
Journal Fur Praktische Chemie, 334 (1992) 333–349, "Phosphororganische antioxidantien XII".
Journal F. Prakt. Chemie, 326, 622–632, "Phosphorganische antioxidantien III".

*Primary Examiner*—Veronica P. Hoke
*Attorney, Agent, or Firm*—Connolly & Hutz

[57] ABSTRACT

The invention relates to flame retardant polymeric compositions which comprise a halogen-free cyclic phosphoric acid ester of the formula (I)

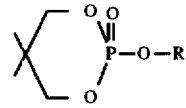

where R=phenyl or methyl substituted phenyl as a flameproofing agent.

2 Claims, No Drawings

FLAME RETARDANT POLYMERIC COMPOSITIONS

The invention relates to flame retardant polymeric compositions.

It is known that polymeric compositions can be given a flame retardant treatment with halogen-containing organic compounds, in particular in combination with antimony trioxide [J. Troitsch, International Plastics Flammability Handbook, Carl-Hanser-Verlag Munich (1990), pages 53–60].

It is also known that plastics molding compositions can be given a flame retardant treatment with halogen-free intumescence flameproofing agents based on ammonium polyphosphate, such as are described, for example, in U.S. Pat. No. 4,198,493, U.S. Pat. No. 4,461,862, EP-A-0 258 685 and EP-A-0 584 567.

Chemical Abstracts 93, 133266 (1980) furthermore contains a reference to the testing of various haloalkyl esters of cyclic phosphoric acid esters as flameproofing agents.

Surprisingly, it has now been found that polymeric compositions which comprise a halogen-free cyclic phosphoric acid ester show an excellent flameproofing effect.

It has thus been possible to demonstrate that in the case of flexible polyester-polyurethane foam, if ammonium polyphosphate, the halogen-free flameproofing agent which is most suitable for this type of PUR foam, is used, 3 times the amount must be employed, compared with a halogen-free cyclic phosphoric acid ester according to the invention, for classification into class UL 94-HF1.

It was surprising and unforeseeable, because ammonium polyphosphate not only has a phosphorus content which is more than twice as high (31.5%, compared with 12.8%), but can also provide an additional improving contribution via the phosphorus/nitrogen synergism at a nitrogen content of 14.5%.

The invention therefore relates to flame retardant polymeric compositions which comprise, as the flameproofing agent, a halogen-free cyclic phosphoric acid ester of the formula

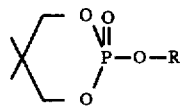

where R=phenyl, 2-methylphenyl, 3-methylphenyl, 4-methylphenyl, 2,3-dimethylphenyl, 2,4-dimethylphenyl, 2,5-dimethylphenyl, 2,6-dimethylphenyl, 3,4-dimethylphenyl or 3,5-dimethylphenyl.

If the flame retardant polymeric compositions comprise the halogen-free cyclic phosphoric acid ester in combination with other flameproofing agents, the other flameproofing agents should preferably be halogen-free.

The flame retardant polymeric composition according to the invention preferably comprises 98 to 60% by weight of polymer or of a polymer mixture and 2 to 40% by weight of a halogen-free cyclic phosphoric acid ester.

The polymers are preferably polyurethane systems.

The polyurethane system preferably comprises 2 to 40% by weight of the halogen-free cyclic phosphoric acid ester.

The polymers can be the substances listed below:

1. Polymers of mono- and diolefins, for example high, medium or low density polyethylene (which can optionally be crosslinked), polypropylene, polyisobutylene, polybut-1-ene, polymethylpent-1-ene, polyisoprene or polybutadiene, and polymers of cycloolefins, such as, for example, of cyclopentene or norbornene.

2. Mixtures of the polymers mentioned under 1., for example mixtures of polypropylene with polyethylene or with polyisobutylene.

3. Copolymers of mono- and diolefins with one another or with other vinyl monomers, such as, for example, ethylene/propylene copolymers, propylene-but-1-ene copolymers, propylene/isobutylene copolymers, ethylene/but-1-ene copolymers, propylene/butadiene copolymers, isobutylene/isoprene copolymers, ethylene/alkyl acrylate copolymers, ethylene/alkyl methacrylate copolymers, ethylene/vinyl acetate copolymers or ethylene/acrylic acid copolymers and salts thereof (ionomers), as well as terpolymers of ethylene with propylene and a diene, such as hexadiene, dicyclopentadiene or ethylidenenorbornene.

4. Polystyrene or poly(p-methylstyrene).

5. Copolymers of styrene or α-methylstyrene with dienes or acrylic derivatives, such as, for example, styrene/butadiene, styrene/maleic anhydride, styrene/acrylonitrile, styrene/ethyl methacrylate, styrene/butadiene/ethyl acrylate or styrene/acrylonitrile/methacrylate; or high impact strength mixtures of styrene copolymers and another polymer, such as, for example, a polyacrylate, a diene polymer or an ethylene/propylene/diene terpolymer, as well as block copolymers of styrene, such as, for example, styrene/butadiene/styrene, styrene/isoprene/styrene, styrene/ethylene-butylene/styrene or styrene/ethylene-propylene/styrene.

6. Graft copolymers of styrene, such as, for example, styrene on polybutadiene, styrene and acrylonitrile on polybutadiene, styrene and maleic anhydride on polybutadiene, styrene and alkyl acrylates or alkyl methacrylates on polybutadiene, styrene and acrylonitrile on ethylene/propylene/diene terpolymers, styrene and acrylonitrile on polyalkyl acrylates or polyalkyl methacrylates, styrene and acrylonitrile on acrylate/butadiene copolymers and mixtures thereof with the copolymers mentioned under 5, which are known, for example, as so-called ABS, MBS, ASA or AES polymers.

7. Polymers which are derived from unsaturated alcohols and amines or acyl derivatives thereof or acetals, such as polyvinyl alcohol, polyvinyl acetate, stearate, benzoate or maleate, polyvinylbutyral, polyalkyl phthalate or polyallylmelamine.

8. Polyphenylene oxides and sulfides and mixtures thereof with styrene polymers.

9. Polyurethanes which are derived from polyethers, polyesters and polybutadienes with terminal hydroxyl groups on the one hand and aliphatic or aromatic polyisocyanates on the other hand, and precursors thereof (polyisocyanate-polyol prepolymers).

10. Crosslinked polymers which are derived from aldehydes on the one hand and phenols, urea or melamine on the other hand, the phenol/formaldehyde, urea/formaldehyde and melamine/formaldehyde resins.

11. Mixtures of the abovementioned polymers or mixtures of polymers which are not mentioned above, such as, for example, PP/EPDM, polyamide 6/EPDM or ABS, PVC/EVA, PVC/ABS, PVC/MBS, PC/ABS, PBTP/ABS, PC/ASA, POM/thermoplastic PUR, POM/MBS, PPE/HIPS, PA/HDPE, PA/PP or PA/PPE.

12. Unsaturated polyester resins. Unsaturated polyester resins are to be understood as the products which can be prepared by condensation reactions from saturated and unsaturated dicarboxylic acids or their anhydrides and diols. Dicarboxylic acids which are mentioned for this are maleic acid and fumaric acid. The monomer used most often is styrene, which can be mixed with polyester resins as desired.

13. Epoxy resins. Epoxy resins are to be understood as compounds which can be prepared by a polyaddition reaction from an epoxide component and a crosslinking component (hardener). The epoxide component can also crosslink with itself by addition of suitable catalysts. Epoxide components which are mentioned are: aromatic polyglycidyl ethers, such as bisphenol A bisglycidyl ether, bisphenol F bisglycidyl ether and bisphenol S bisglycidyl ether, polyglycidyl ethers of phenol/formaldehyde and cresol/formaldehyde resins, diglycidyl ethers of phthalic, tetrahydrophthalic, isophthalic and terephthalic acid, triglycidyl cyanurate and/or hydantoin epoxy resins. The crosslinking (curing) can be carried out with polyamines, such as triethylenetetramine, polyamidoamines or polybasic acids or anhydrides thereof, for example phthalic anhydride or hexahydrophthalic anhydride, if appropriate with the addition of accelerators and/or catalysts.

The polymeric compositions according to the invention can also additionally comprise up to 80% by weight of fillers and reinforcing agents, such as, for example, calcium carbonate, silicates, glass fibers, asbestos, talc, kaolin, mica, barium sulfate, metal oxides and hydroxides, carbon black and/or graphite.

Molding compositions which additionally comprise 10 to 50% by weight of fillers and reinforcing agents are preferred here.

The halogen-free cyclic phosphoric acid esters such as are used according to the invention can be prepared by the following process steps:

1. Reaction of 2,2-dimethyl-1,3-propanediol with phosphorus oxychloride:

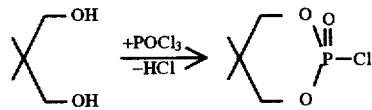

2. Reaction of the cyclic phosphoric acid ester chloride (I) with phenols:

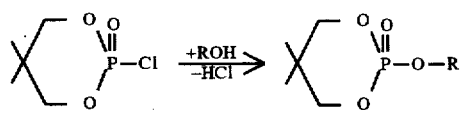

The reactions can be carried out in suitable inert solvents, such as aromatics, aliphatics, cycloaliphatics or chloroaliphatics, and in the presence of suitable tertiary amines, such as triethylamine or pyridine, and in the presence of suitable catalysts, such as aluminum chloride.

The process for the preparation of these halogen-free cyclic phosphoric acid esters can be carried out under normal pressure or under reduced pressure.

The percentage data in the following examples are percentages by weight.

EXAMPLE 1

(Preparation of the flameproofing agent)

5,5-Dimethyl-2-oxo-2-phenoxy-1,3,2-dioxaphosphorinane was prepared and purified in accordance with the method of R. L. McConnell and H. W. Coover jr., J. Org. Chem. 24, 630–636 (1959).

EXAMPLES 2 TO 10

The experiments for production of flame retardant flexible polyester-polyurethane foams were based on the following recipe (parts are parts by weight):

100 parts of polyol ®Desmophen 2200, a polyester-polyol from BAYER AG, Leverkusen, having a hydroxyl number of 60 mg of KOH/g, a density of 1.18 g/ml and a viscosity of 17,500 mpa·s at 25° C.

2.5–20 parts of flameproofing agent 3.5 parts of water 1.5 parts of catalyst ®Desmorapid DB, a tertiary amine from BAYER AG, Leverkusen, as a slightly yellowish, clear liquid having a density of about 0.9 g/ml at 25° C. and a boiling point of 179°–182° C.

1.0 part of silicone stabilizer ®Niax SE-232, a silicone stabilizer from OSi Specialities S.A., Meyrin (Switzerland), having a density of 1.01 g/ml at 25° C. and a viscosity of 330 mpa·s at 25° C.

45.5 parts of diisocyanato-toluene ®Desmorapid T80, an 80/20 mixture of 2,4- and 2,6-diisocyanatotoluene from BAYER AG, Leverkusen, having a density of 1.221 g/ml at 20° C. and a melting point of 13.6° C.

The following flameproofing agents were employed in the examples below:

Product from Example 1

®Hostaflam AP 422, a long-chain ammonium polyphosphate from HOECHST AG, Frankfurt, having a density of 1.9 g/ml, a phosphorus content of 31.5% and a nitrogen content of 14.5%.

To evaluate the flame retardancy, burning tests were carried out in accordance with ASTM-D2863 (oxygen index), (J. Troitzsch, ibidem, pages 217–218), in accordance with the UL 94 horizontal test for flexible foam (J. Troitzsch, ibidem, pages 348–349) and in accordance with DIN 4102, Part 1.

As the comparison examples with ammonium polyphosphate, the standard flameproofing agent for halogen-free flame retardant flexible polyester-PUR foams, in Table 1, Examples 5–7 show, in spite of a phosphorus content of the foam of 2.06 to 3.87%, no classification into class DIN 4102-B2 is possible.

On the other hand, in the experiments with the halogen-free cyclic phosphoric acid ester according to the invention, a DIN 4102-B2 classification is already achieved at phosphorus contents of >1.21%.

The difference in the flameproofing effectiveness becomes even clearer in the UL 94 horizontal test (cf. Table 2). In this case, a UL 94-HF1, the best class in the UL 94 horizontal test, is achieved with only 0.43% of phosphorus in the flexible PUR foam, while phosphorus contents of 2.99% are required for the same classification in the case of ammonium polyphosphate.

TABLE 1

Determination of the flame retardancy in accordance with DIN 4102, Part 1, on flexible polyester-polyurethane foams

| Example No. | Flameproofing agent Type | Amount (php)[1] | Density (kg/m²) | P content of the foam (%) | N content of the foam from the flameproofing agent (%) | DIN 4102 (edge flaming) Flame height (mean) (mm) | Class[2] |
|---|---|---|---|---|---|---|---|
| 2 (Invention) | Product from Example 1 | 10 | 30 | 0.83 | – | >150 | B3 |
| 3 (Invention) | Product from Example 1 | 15 | 33 | 1.21 | – | 145 | B2 |
| 4 (Invention) | Product from Example 1 | 20 | 35 | 1.57 | – | 125 | B2 |
| 5 (Comparison) | Hostaflam AP 422 | 10 | 30 | 2.06 | 0.95 | >150 | B3 |
| 6 (Comparison) | Hostaflam AP 422 | 15 | 32 | 2.99 | 1.38 | >150 | B3 |
| 7 (Comparison) | Hostaflam AP 422 | 20 | 34 | 3.87 | 1.78 | >150 | B3 |

[1] php = parts per 100. parts of polyol (parts by weight/100 parts by weight of polyol)
[2] requirements: Class B3 - flame height (mean): >150 mm Class B2 - flame height (mean): <150 mm, no individual measurement >150 mm

TABLE 2

Determination of the flame retardancy in accordance with the oxygen index test (ASTM-D2863) and UL-94 horizontal test on flexible polyester-polyurethane foams

| Example No. | Flameproofing agent Type | Amount (php)[1] | Density (kg/m²) | P content of the foam (%) | Oxygen index (% of O₂) | UL 94 class[2] |
|---|---|---|---|---|---|---|
| 8 (Invention) | Product from Example 1 | 2.5 | 29 | 0.22 | 22.0 | HBF |
| 9 (Invention) | Product from Example 1 | 5 | 32 | 0.43 | 22.5 | HF 1 |
| 10 (Invention) | Product from Example 1 | 7.5 | 31 | 0.62 | 23.5 | HF 1 |
| 2 (Invention) | Product from Example 1 | 10 | 30 | 0.83 | 24.0 | HF 1 |
| 3 (Invention) | Product from Example 1 | 15 | 33 | 1.21 | 25.0 | HF 1 |
| 4 (Invention) | Product from Example 1 | 20 | 35 | 1.57 | 26.0 | HF 1 |
| 5 (Comparison) | Hostaflam AP 422 | 10 | 30 | 2.06 | 23.0 | HBF |
| 6 (Comparison) | Hostaflam AP 422 | 15 | 32 | 2.99 | 24.0 | HF1 |
| 7 (Comparison) | Hostaflam AP 422 | 20 | 34 | 3.87 | 24.5 | HF1 |

[1] php = parts per 100 parts of polyol (parts by weight/100 parts by weight of polyol)
[2] requirements: Class HBF: burning rate < 38 mm/minute Class HF1: no burning drips, after-burning time < 2 seconds Class HF2: burning drips, after-burning time < 2 seconds

I claim:

1. A flame-retardant composition comprising polyurethane and a halogen-free cyclic phosphoric acid ester of the formula (I)

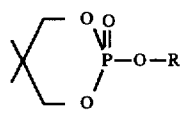

where R represents phenyl, 2-methylphenyl, 3-methylphenyl, 4-methylphenyl, 2,3-dimethylphenyl, 2,4-dimethylphenyl, 2,5-dimethylphenyl, 2,6-dimethylphenyl, 3,4-dimethylphenyl or 3,5dimethylphenyl.

2. A composition as claimed in claim 1, which comprises 98 to 60% by weight of polyurethane and 2 and 40% by weight of a halogen-free cyclic phosphoric acid ester of the formula (I).

* * * * *